Aug. 30, 1927.
J. S. MILLER, JR
1,640,796
PLASTIC FLOOR AND BEARING THEREFOR
Filed April 29, 1925
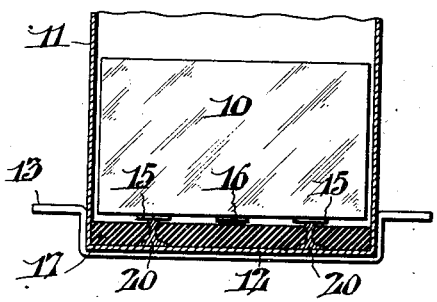
FIG. I.
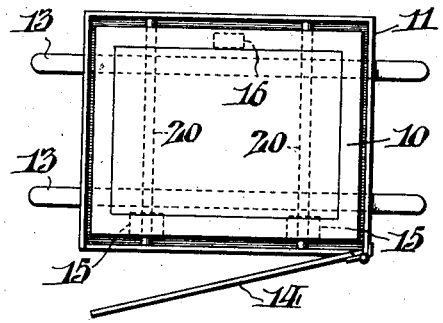
FIG. II.
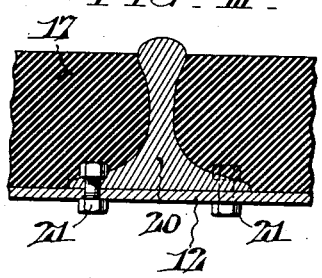
FIG. III.
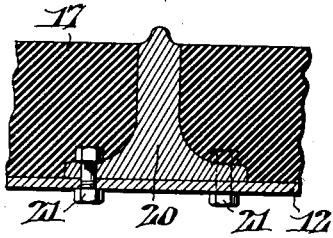
FIG. IV.
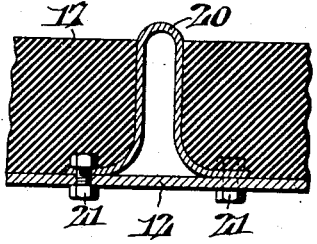
FIG. V.
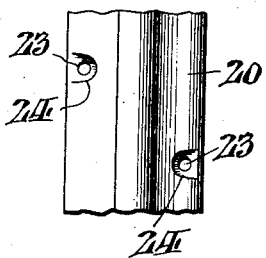
FIG. VI.
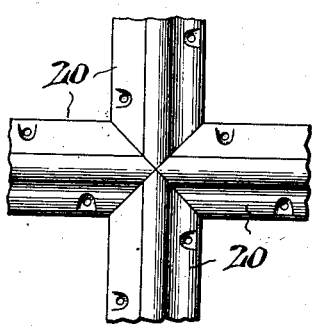
FIG. VII.
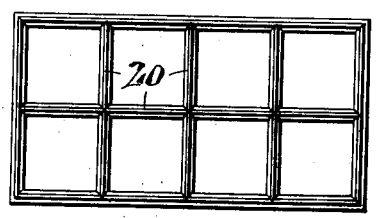
FIG. VIII.
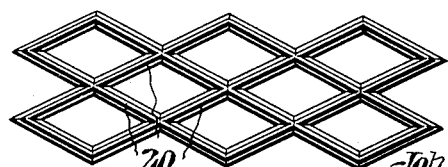
FIG. IX.
WITNESSES
INVENTOR:
John Strother Miller Jr,
BY
ATTORNEYS.

Patented Aug. 30, 1927.

1,640,796

UNITED STATES PATENT OFFICE.

JOHN STROTHER MILLER, JR., OF RAHWAY, NEW JERSEY, ASSIGNOR TO THE BARBER ASPHALT COMPANY, OF PHILADELPHIA, PENNSYLVANIA, A CORPORATION OF WEST VIRGINIA.

PLASTIC FLOOR AND BEARING THEREFOR.

Application filed April 29, 1925. Serial No. 26,604.

My invention relates to plastic floors and bearings therefor, the object being to provide floors of this character that can sustain heavy loads without indentation, and without being made of unduly hard material to avoid indentation. My invention is very advantageous in cases where a floor is subject to vibration, or to extremes of temperature, so that if of hard material, the floor would tend to crack. The invention is peculiarly adaptable to floors which in service are exposed to acids or other corrosives, especially when other service conditions make them liable to cracking: e. g., the floors of storage battery compartments of railway passenger coaches. Accordingly, I have hereinafter explained the invention with particular reference to its embodiment in such a battery compartment.

In present practice, storage battery compartments of passenger coaches are provided with heavy wood floors, laid on thin sheet iron plates or subfloors carried by heavy strap irons, which usually support the whole compartment. As the batteries housed in such compartments are very heavy, they are provided with porcelain rollers and skids to facilitate removal and replacement. Generally, a battery box has a couple of porcelain skid blocks near its front, adjacent the lateral door of the compartment, and one or more porcelain rollers near its back, adjacent the inner or rear wall of the compartment. Acid or other corrosive electrolyte spills from the battery in service and attacks the wooden floor, causing it to crack and splinter badly; and when the porcelain roller (especially) happens to get into such a crack in the floor, it becomes difficult to remove the heavy battery from the compartment.

This and other drawbacks of present practice are completely obviated by my invention.

In the drawings, Fig. I shows a somewhat diagrammatic vertical section through the battery compartment of a passenger coach, with a floor constructed in accordance with my invention.

Fig. II is a diagrammatic plan view of such a battery compartment.

Fig. III shows a fragmentary section through a portion of a floor such as shown in Fig. I on a larger scale than that figure, illustrating a form of bearing means.

Fig. IV is a similar view illustrating another form of bearing means.

Fig. V is a similar view illustrating still yet another form or type of bearing means.

Fig. VI is a fragmentary plan view of a bearing strip such as shown in Figs. I–V, illustrating one method of securing it to the subjacent structure.

Fig. VII is a fragmentary plan view illustrating the use of bearing strips extending in more than one direction.

Fig. VIII is a plan view of a grid structure made up of bearing strips extending at right angles to one another.

Fig. IX is a similar view of a grid structure composed of bearing strips extending obliquely to one another.

In Figs. I and II is shown a battery box 10 in the battery compartment 11 of a railway car, for example. As here shown, the bottom plate 12 forming the sub-floor of the compartment 11 is supported by strap irons 13, 13 extending beneath it, as well as the compartment walls. The battery box 10 may be introduced into the compartment 11 and removed through the usual door 14 at the front of the compartment. As shown, the battery box 10 is provided with skid blocks 15, 15 at the front and with a roller 16 at the rear, to facilitate its introduction and withdrawal.

The compartment 11 has a monolithic floor 17 of plastic character, laid on the sub-floor 12; or in other words, a floor of such composition that its ability to sustain loads is dependent on temperature as well as on the intensity of the pressure. Preferably, the floor 17 is of acid-proof plastic material, such as those known commercially as asphaltic or bituminous mastics, and used for light sidewalks, etc. Instead, however, of employing for the floor 17 a mastic capable of sustaining the heavy load of the battery weight concentrated on its supports 15, 16, and hence of such exceptionally hard consistency as to be likely to crack under the vibration to which it is subjected in railway service, I preferably use a mastic so relatively soft as to be free from liability of cracking, even though incapable of sustaining the battery weight without indentation.

In this connection, it is to be remarked that cracking of a floor under such conditions of use as obtain in a railway battery compartment is highly objectionable, not only because of the trouble and expense of repair, but also because it permits acid or other electrolyte spilled from the battery box 10 to seep through the cracks to the subfloor 12, and corrode and injure it. Even when a policy of prompt repair is conscientiously followed, such seepage and deterioration of the sub-floor 12 will always go on for some little time before cracks can be detected and the car sent to the repair shop.

To obviate indentation of a relatively soft floor 17, such as above described, by the load of the battery weight, I provide special supporting means for the battery 10, such as bearing members 20 secured to the sub-floor 12 in any suitable way, as indicated at 21, and embedded in the plastic floor material 17. Preferably, the members 20 are rounded or cambered at the top, as shown in Fig. I, and are superficially exposed through the plastic floor 17 to engage the battery 10 (or its supports 15) and take the heavy load of the battery weight, so that the supports 15, 16 which permit the box 10 to be moved around easily when out of the compartment 11; do not rest on the plastic floor 17 when the box 10 is in the compartment. Such bearing means 20 need not, however, project above the floor surface sufficiently to interfere with movement of light (live) loads on the floor: e. g., loads such as the floor 17 can sustain without being made hard enough to be in danger of cracking. As shown, the bearing members 20 have the form of strips of an inverted T-like cross-section, with broad, thin bases resembling those of a railroad rail, but without the greatly reduced upright web characteristics of such rails. Only a single battery 10 is shown in the compartment 11 in the present instance; accordingly, there are two of the bearing members 20 extending parallel to one another from front to back of said compartment. These members 20, 20 are at such distances from the side or end walls of the compartment 11 that the range of movement of the battery 10 permitted by the clearances afforded by the compartment will not allow the battery 10 (or, preferably, even its supports 15, 15) to get completely off either bearing member 20, 20.

It will be seen, therefore, that the members 20, 20 serve as slide ways for the easy movement of the battery box 10.

Bearing members 20 suitable for the purposes of my invention can be made of any suitable material, that will afford the necessary strength and the other qualities desired, and will be resistant to or proof against the action of acid or electrolyte, or of any corrosive agent to which they may be exposed in service: e. g., porcelain, salt glazed tile, or acid proof metal. Such members 20 may take a great variety of forms, two of which are shown in Figs. III and IV on a larger scale than in Figs. I and II. The base portions of these forms are substantially alike, but the upright portion of that shown in Fig. III is of an inverted bulb-like configuration, and the upright portion of the other is substantially uniform, with a relatively narrow rounded ridge along its top. If of metal, such a bearing member may conveniently be made of a sheet metal strip bent to an inverted U configuration, as shown in Fig. V. In any case, the base of the member 20 may have holes 23 for the securing bolt members 21, and recesses 24 in its sloping upper surface to accommodate the bolt heads, as shown in Fig. VI.

In some cases, where the conditions of use make it desirable, bearing strips 20 may extend in more than one direction, as illustrated in Fig. VII. Indeed, they may even form a unitary grid, composed (for instance) of squares, such as shown in Fig. VIII, or as diamonds, such as shown in Fig. IX, but with the tops of their component members rounded as in the preceding figures. Such arrangements of bearing permit loads to slide in practically any direction desired without indentation of the floor, and thus allowing it to be made soft enough to obviate all possible risk of cracking.

Having thus described my invention, I claim:

1. The combination of a relatively soft plastic floor subject to vibration in service with bearing means therein superficially exposed thereabove to wholly sustain and facilitate movement of heavy loads without indentation of the plastic floor.

2. The combination of a relatively soft plastic floor with rounded bearing means therein superficially exposed thereabove to wholly sustain and permit movement of heavy loads without indentation of the plastic floor.

3. The combination with a metallic subfloor and a relatively soft plastic floor thereon, in service subject to vibration and exposed to acid, of acid-proof round-topped bearing strips secured to the subfloor and embedded in the plastic floor material, with their tops projecting and superficially exposed above the plastic to wholly sustain and aid movement of heavy loads without contacting with the plastic floor.

4. The combination of a compartment of with relatively soft plastic floor, a heavy deadload normally housed in said compartment, and bearing strips projecting and superficially exposed above the floor material to wholly sustain and aid movement of the deadload without contacting with or indentation of the plastic floor; the distances of the strips from the adjacent compartment walls being greater than those of the load therefrom permitted by the relative proportions of load and compartment, so that the load cannot be displaced off the bearing strips.

In testimony whereof, I have hereunto signed my name at Maurer, N. J., this twenty-first day of April, 1925.

JOHN STROTHER MILLER, Jr.